(12) United States Patent
Hall et al.

(10) Patent No.: US 7,403,712 B2
(45) Date of Patent: Jul. 22, 2008

(54) MATRIX TIME DIVISION MULTIPLEX (MTDM) INTERROGATION

(75) Inventors: David B. Hall, La Crescenta, CA (US); Paul L. Greene, La Crescenta, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 495 days.

(21) Appl. No.: 11/062,680

(22) Filed: Feb. 22, 2005

(65) Prior Publication Data

US 2006/0188256 A1    Aug. 24, 2006

(51) Int. Cl.
*H04J 14/00* (2006.01)

(52) U.S. Cl. .............................. 398/75; 398/79; 398/82; 398/83; 398/182; 398/183; 398/202; 398/169; 398/170; 398/33; 398/177; 398/45; 398/48; 398/30; 398/31; 398/66; 398/67; 398/68; 398/69; 398/71; 398/72; 385/24; 385/37; 385/16; 385/17; 385/18

(58) Field of Classification Search ................ 398/75, 398/47, 45, 147, 48, 52, 53, 148, 83, 158, 398/159, 101, 102, 98, 99, 100, 79, 65, 82, 398/66, 67, 68, 69, 70, 71, 72, 182, 183, 398/202, 169, 170, 177, 33, 30, 31; 385/24, 385/37, 16, 17, 18

See application file for complete search history.

(56) References Cited

U.S. PATENT DOCUMENTS

| | | | | |
|---|---|---|---|---|
| 3,849,604 A | * | 11/1974 | Benes et al. ................ | 398/102 |
| 4,467,468 A | * | 8/1984 | Miller ......................... | 398/75 |
| 5,625,479 A | * | 4/1997 | Suzuki et al. ................. | 398/98 |
| 5,818,585 A | | 10/1998 | Davis et al. | |
| 6,075,907 A | | 6/2000 | Krol et al. | |
| 6,724,994 B1 | | 4/2004 | Collis et al. | |
| 7,088,495 B2 | * | 8/2006 | Trepagnier et al. .......... | 359/326 |
| 2005/0286894 A1 | * | 12/2005 | Duelk ......................... | 398/75 |

FOREIGN PATENT DOCUMENTS

| | | |
|---|---|---|
| EP | 0 866 324 A | 9/1998 |
| EP | 1 137 213 A | 3/2001 |
| WO | WO 00/62021 | 10/2000 |

OTHER PUBLICATIONS

Nash, P.J., et al; Design, Development and Construction of Fibre-Optic bottom Mounted Array; 15th Optical Fiber Sensors Conference, 2002.
Technical Digest, OFS 2002; pp. 333-336; vol. 1; IEE Piscataway, NJ.

* cited by examiner

*Primary Examiner*—Hanh Phan
(74) *Attorney, Agent, or Firm*—Patti, Hewitt & Arezina LLC

(57) ABSTRACT

Embodiments of present system encompass: a plurality of laser sources that produce a plurality of respectively different optical wavelengths; a matrix switch having a plurality of inputs operatively coupled to the plurality of laser sources, each of the plurality of inputs receiving a respective optical wavelength; and the matrix switch having an output that produces a series of interleaved pulses of the different optical wavelengths.

10 Claims, 5 Drawing Sheets

MATRIX TIME DIVISION MULTIPLEX (MTDM) INTERROGATION

TECHNICAL FIELD

The present invention relates generally to sensor interrogation, and in particular to optical matrix multiplex interrogation of sensors.

BACKGROUND

Wavelength division multiplexing (WDM) enables significant increases in the data rates that can be carried over a single fiber by the use of multiple wavelengths, each carrying a separate "channel". Time division multiplexing (TDM) techniques have limitations since the wider bandwidth required around a single base wavelength leads to impairments that limit the distance achieved. These impairments are: attenuation, reflectance, especially at splices involving flat cleaves, and chromatic dispersion due to slightly different refractive indexes at different wavelengths.

Combinations of TDM/WDM result in a capacity of 100 Gbit/s per fiber. One development has enabled the efficient application of WDM systems in real networks rather than just as point-to-point multiplex systems. The Erbium-doped fiber amplifier (EDFA) allows for the direct amplification of the optical signal without the need for intermediate electronic circuitry.

Known interrogation methods currently use fiber optic acoustic sensor arrays in what is referred to as TDM-WDM (Time division multiplexing-wavelength division multiplexing). For example, these methods currently allow for the interrogation of a greater number of hydrophones with a lesser number of laser sources.

Associated with each wavelength is a single laser source that runs continuous wave (CW). The output of the laser is gated by a fast optical switch with a low duty cycle that produces a stream of regularly spaced pulses that are amplified and sent down to a remote array of sensors dedicated to a single wavelength. For every optical pulse sent down to the sensors there are N pulses returning to the optical receiver for each of the N sensors under interrogation.

The gating process of one pulse out and N pulses returning is occurs for each laser source with its characteristic wavelength and dedicated sensors. The fast optical switch is designed to gate the light from all laser sources at the same time. This requires the multiplexing of all laser wavelengths onto the same fiber optic line with the losses associated with the multiplexing.

Each optical pulse exiting the optical gate contains all the wavelengths from the multiple laser sources. The pulse is amplified by a chain of erbium doped fiber amplifiers (EDFA's) to a peak power level that can exceed one watt. Such a high power level is required at the launch point to overcome the substantial fiber optic transmission and splitting losses experienced downstream in the fiber optic acoustic sensor system.

Various non-linear optical effects that can severely degrade over-all system performance affect light composed of multiple evenly spaced wavelengths at sufficiently high power. These effects include Brillouin scattering, Raman scattering, self-phase modulation, cross-phase modulation, and four wave mixing. Avoiding the presence of multiple wavelengths on the same fiber optic line at the same time will completely eliminate cross phase modulation and four wave mixing while mitigating the other effects.

It is desirable to use the least number of laser sources as possible to interrogate the largest number possible of sensors. For example, for each pulse of a laser source there may be 64 returning sensor pulses. However, as the number of pulses increase, so does the required bandwidth. Thus, the interrogation is limited by the available bandwidth. Therefore, there is a need for an interrogation system that is an improvement over the prior art systems.

SUMMARY

The invention in one implementation encompasses: a plurality of laser sources that produce a plurality of respectively different optical wavelengths; a matrix switch having a plurality of inputs operatively coupled to the plurality of laser sources, each of the plurality of inputs receiving a respective optical wavelength; and the matrix switch having an output that produces a series of interleaved pulses of the different optical wavelengths.

The invention in another implementation encompasses: a laser source that produces an optical wavelength; a matrix switch having an input operatively coupled to the laser source; and the matrix switch having a plurality of outputs, each of the outputs producing an optical wavelength, the optical wavelengths being interleaved relative to one another.

The invention in a further implementation encompasses: a plurality of laser sources that produce a plurality of respectively different optical wavelengths; a matrix switch having a plurality of inputs operatively coupled to the plurality of laser sources, each of the plurality of inputs receiving a respective optical wavelength; and the matrix switch having a plurality of outputs, each of the outputs producing an optical wavelength, the optical wavelengths being interleaved relative to one another, and each output producing a series of interleaved pulses of the different optical wavelengths.

BRIEF DESCRIPTION OF THE DRAWINGS

Features of exemplary implementations of the invention will become apparent from the description, the claims, and the accompanying drawings in which:

DETAILED DESCRIPTION

The particular values and configurations discussed in these non-limiting examples can be varied and are cited merely to illustrate an embodiment of the present invention and are not intended to limit the scope of the invention.

In time division multiplexing (TDM) a series of very short optical pulses are time-interleaved (multiplexed) to get a single high speed data stream at one carrier wavelength. An alternate solution is to transmit each optical signal on a different wavelength, known as wavelength division multiplexing (WDM). This is analogous to transmitting different radio channels on different frequencies through air. A WDM channel is a signal running on a unique wavelength. Each WDM channel is completely independent of the other channels, both with regards to bit rates, as well as protocols.

Figure 1:
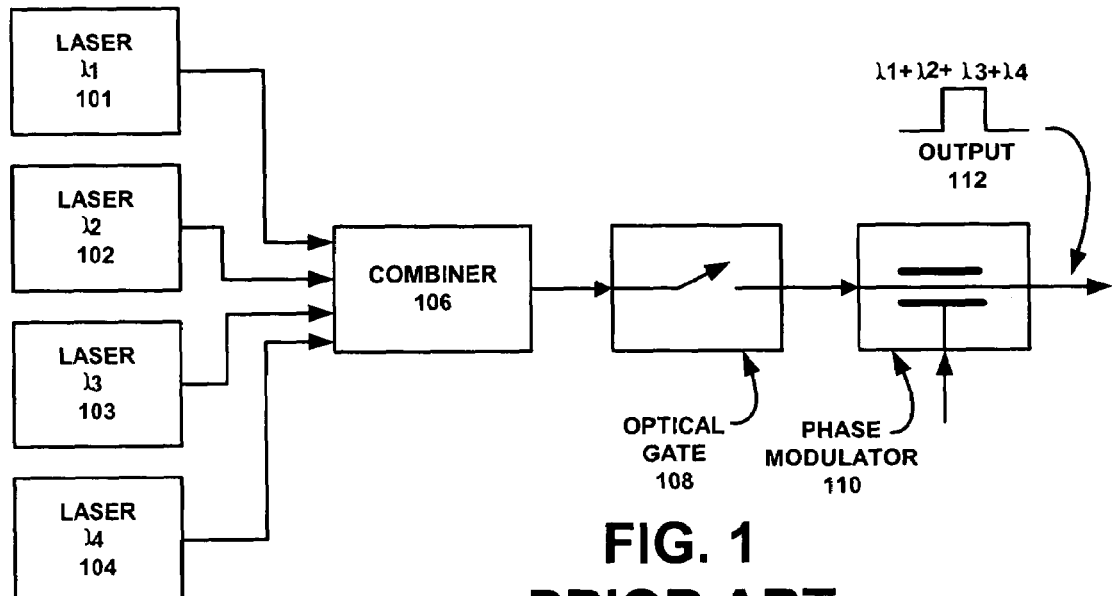
FIGS. 1 and 2 depict block diagrams of prior art systems.

FIG. 1 depicts a known implementation of a TDM-WDM system using four lasers 101, 102, 103, 104 of separate wavelengths λ1, λ2, λ3, λ4 with a combiner 106 and a single common optical gate 108. In this embodiment the combiner 106 is nonblocking, that is, with the four inputs depicted in FIG. 1 the output is always in an "on" state. Current TDM-WDM interrogated arrays use a single optical gate 108 to define the optical pulses used to access individual sensors. It is also known to use a phase modulator 110 to phase generate a carrier. The resulting output pulse is a combination or summation of wavelengths λ1, λ2, λ3, λ4 at output 112.

Figure 2:
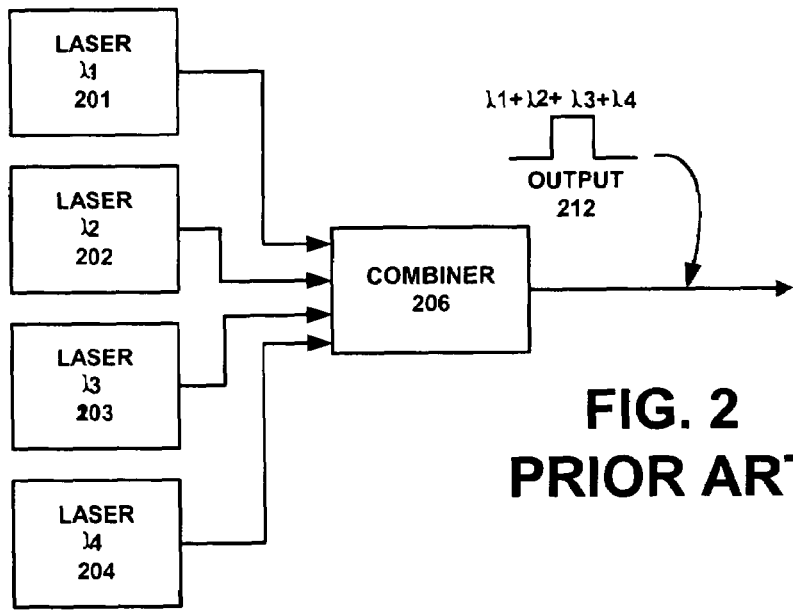

FIG. 2 depicts a known implementation of a TDM-WDM system using four lasers 201, 202, 203, 204 of separate wavelengths λ1, λ2, λ3, λ4 with a combiner 206, but that omits the single common optical gate 108 and the phase modulator 110. In this embodiment the combiner 206 is blocking, that is, the output of the combiner 206 directly produces the depicted waveform of interleaved pulses. Also, the phase generator may be omitted if the lasers are FM (frequency modulated). This is because the sine wave frequency modulation is equivalent to sine wave phase modulation. This circuit will also emit the output pulse that is a combination or summation of wavelengths λ1, λ2, λ3, λ4 at output 112.

Figure 3:
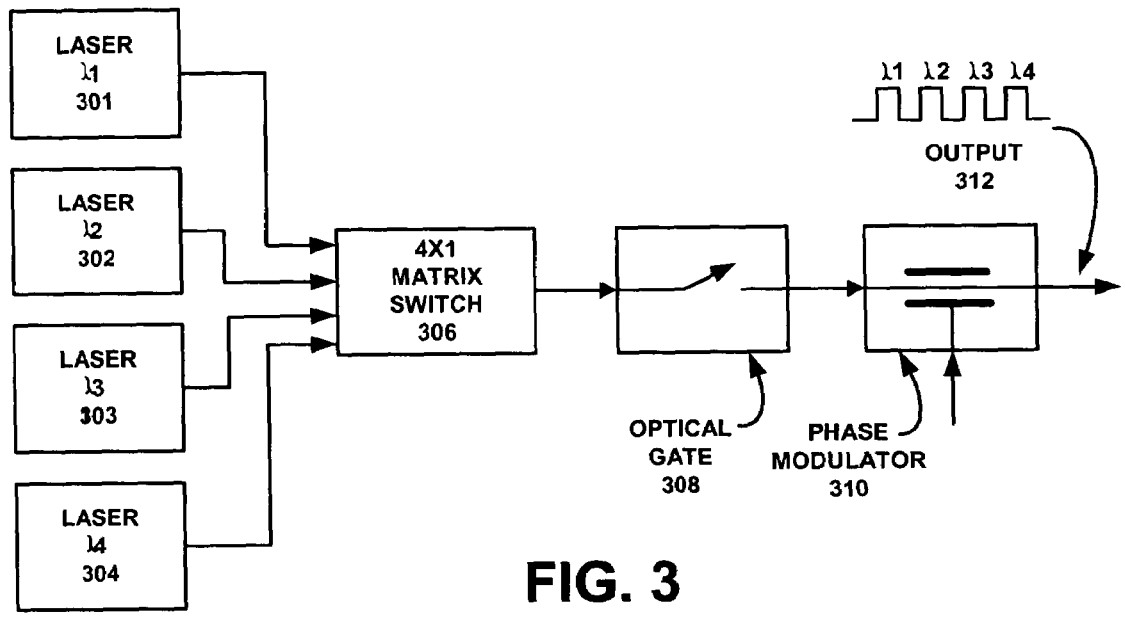
FIGS. 3 and 4 depict block diagrams that illustrate elements of a system in accordance with one embodiment of the present system.

FIG. 3 depicts an embodiment with a nonblocking 4×1 matrix TDM optical switch according to the present apparatus. In this embodiment of a TDM-WDM system four lasers 301, 302, 303, 304 of separate wavelengths λ1, λ2, λ3, λ4 are operatively coupled to inputs of a matrix switch 306. An output of the matrix switch 306 is operatively coupled to an optical gate 308 and a phase modulator 310. The optical matrix switch 306 enables the interleaving of the pulses in the output 312 so that multiple wavelengths are never present in a single pulse. Optical switching combined with optical gating makes more efficient use of the lasers and avoids the nonlinear effects of cross phase modulation and four wave mixing.

The optical switch 306 may perform the gating with appropriate time delays of the different wavelength channels to form the regular sequence of pulses at the output 312. The switch 306 may do all the gating and switching. An auxiliary optical gate 308 may be used to improve the extinction ratio and/or the pulse rise and fall times if needed. The auxiliary switch 308 may be either electro-optic or acousto-optic. A phase modulator 310 may also be used.

Optical matrix switches of the electro-optic type have been demonstrated by many researchers, and at least one is commercially available from Lynx Photonic Networks, Inc.

Figure 4:
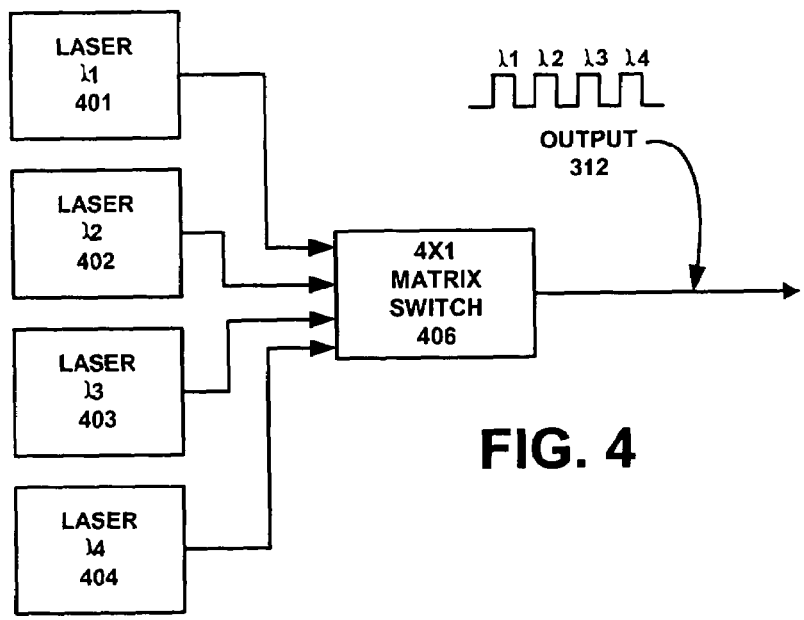

FIG. 4 depicts an embodiment with a blocking 4×1 matrix TDM optical switch according to the present apparatus in which an optical gate and a phase modulator are omitted. In this embodiment of a TDM-WDM system, four FM frequency modulated lasers 401, 402, 403, 404 of separate wavelengths λ1, λ2, λ3, λ4 are operatively coupled to inputs of a matrix switch 406. The output has the sequence of pulses where wavelengths λ1, λ2, λ3, λ4 occur in separate pulses and where the sequence repeats.

Figure 5:
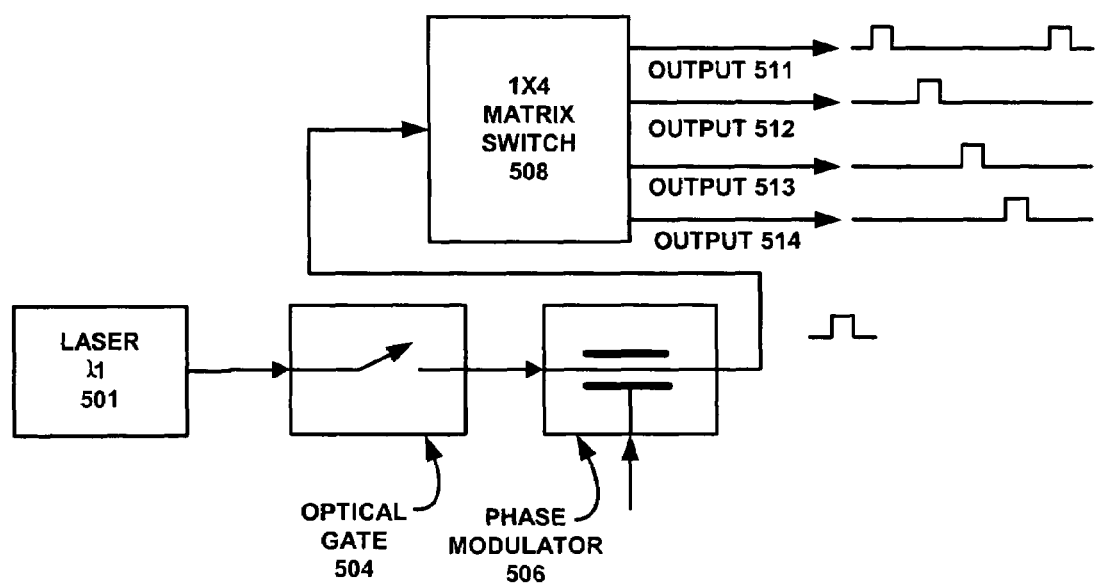
FIG. 5 depicts a block diagram of another embodiment of the present system.

FIG. 5 depicts an embodiment of the present system in which a single wavelength channel may be switched to four separate output channels 511, 512, 513, 514. In this fashion, a single laser 501 may interrogate four times as many hydrophones, for example, as compared to known systems, thus quadrupling the acoustic sensor sampling rate per laser. An input of the nonblocking 1×4 matrix switch 508 may be operatively coupled to the laser 501 via an optical gate 504 and phase modulator 506. In other embodiments the optical gate 504 and the phase modulator 506 may be omitted if a blocking matrix is used with an FM modulated laser. The outputs of the switch 508 may have individual pulses that are offset in time relative to one another as depicted in FIG. 5

In short, the WDM implementation of the TDM matrix switch in FIGS. 3 and 4 eliminates severe non-linear effects by eliminating multi-wavelength pulse propagation and the TDM implementation of the TDM matrix switch in FIG. 5 produces many more sensor returns per wavelength.

Figure 6:
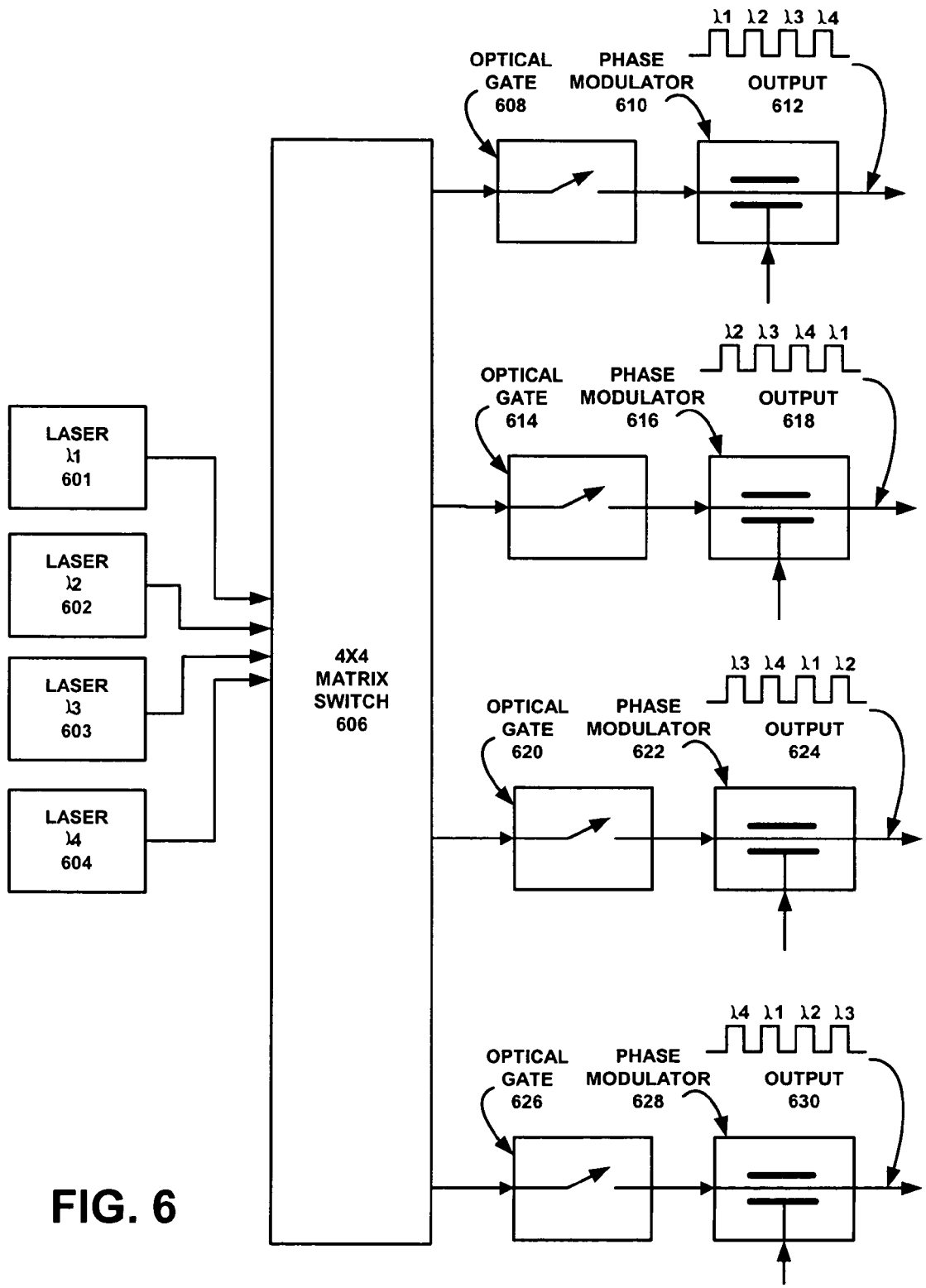
FIG. 6 depicts a block diagram of a further embodiment of the present system.

FIG. 6 depicts an embodiment of the present system, which has a nonblocking 4×4 version of a matrix TDM switch 606 that combines the WDM and the TDM features and advantages of the above described embodiments. In this embodiment of a TDM-WDM system, four lasers 601, 602, 603, 604 of separate wavelengths λ1, λ2, λ3, λ4 are operatively coupled to inputs of the matrix switch 606. Each of four outputs 612, 618, 624, 630 may be coupled to the switch 606 via respective optical gate 608, 614, 620, 626 and phase modulator 610, 618, 624, 630. As described above the optical gates and phase modulators may be eliminated if a blocking matrix switch is used with FM modulated lasers.

Figure 7:
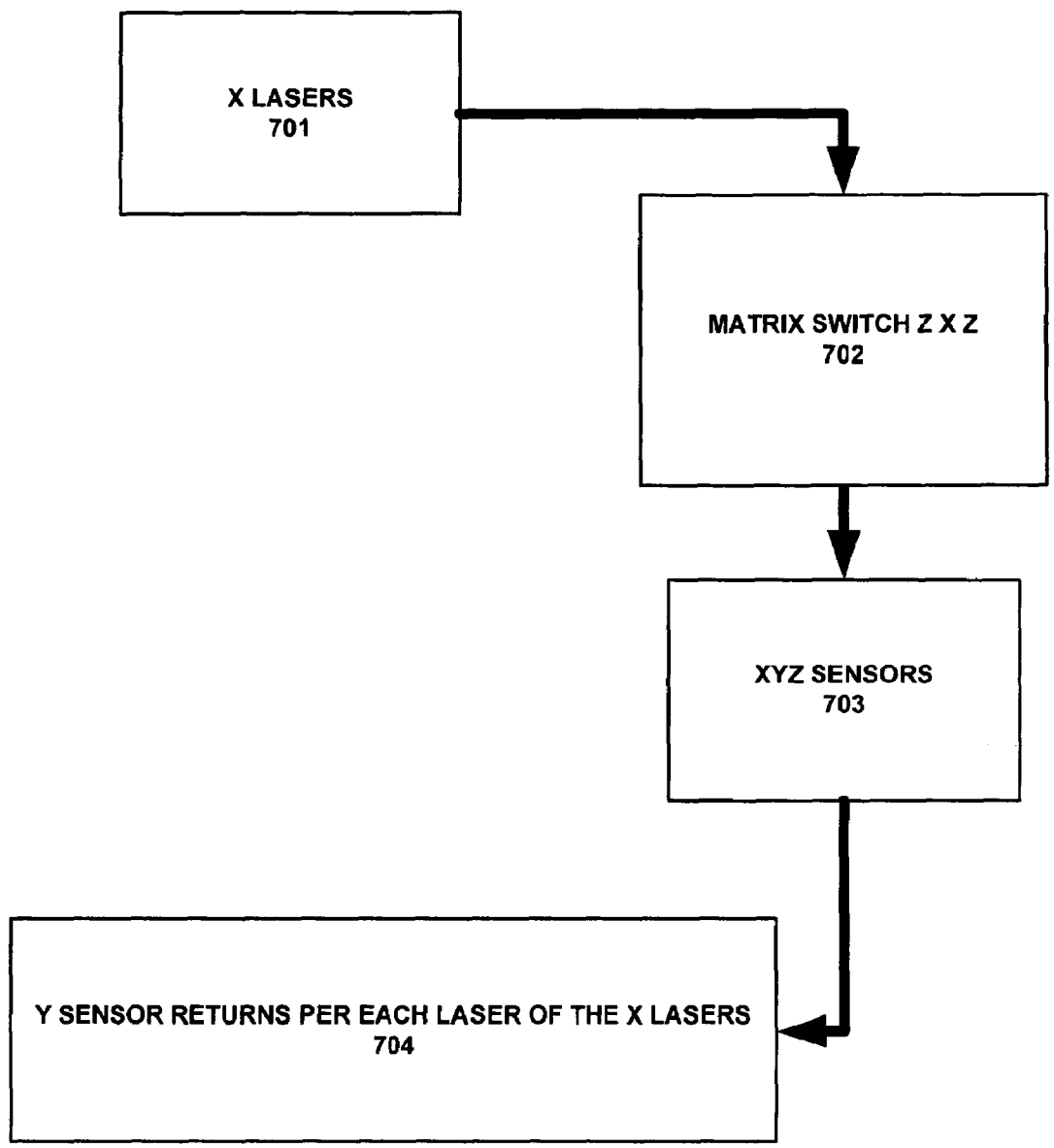
FIG. 7 depicts a block diagram of another embodiment of the present system.

FIG. 7 depicts a block diagram of another embodiment of the present system. As depicted the TDMX system may interrogate XYZ sensors 703 with X lasers 701, Y sensor returns 704 per laser, and Z switch positions for a Z x Z switch 702 without multi-wavelength non-linear effects that degrade system performance.

The steps or operations described herein are just exemplary. There may be many variations to these steps or operations without departing from the spirit of the invention. For instance, the steps may be performed in a differing order, or steps may be added, deleted, or modified.

Although exemplary implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

What is claimed is:

1. An apparatus, comprising:
    a laser source that produces optical wavelengths;
    a matrix switch having an input operatively coupled to the laser source; and
    the matrix switch having outputs, the outputs producing respectively optical wavelengths, the optical wavelengths being interleaved relative to one another;
    wherein outputs of the apparatus are operatively coupled to sensors, and wherein the apparatus interrogates XYZ sensors, where XYZ is the number of sensors, with X lasers that form the laser source, where X is the number of lasers, Y sensor returns per laser, where Y is the number of sensor returns per laser, and Z switch positions for a Z x Z matrix switch in the apparatus, where Z is the number of switch positions, and where X, Y, and Z are whole numbers.

2. The apparatus according to claim 1, wherein the matrix switch has one input and m outputs, where m is the number of matrix switch outputs, and where m is a whole number.

3. The apparatus according to claim 1, wherein at least one of an optical gate, a phase modulator, and a series combination of an optical gate and a phase modulator is operatively coupled between the laser source and the matrix switch.

4. The apparatus according to claim 3, wherein the matrix switch has m inputs and one output, where m is the number of matrix switch inputs, and where m is a whole number.

5. The apparatus according to claim 1, wherein the matrix switch has functions of gating and switching.

6. The apparatus according to claim 1, wherein the apparatus is a time division multiplexer-wavelength division multiplexer (TDM-WDM) system.

7. An apparatus, comprising:

m laser sources that produce respectively m different optical wavelengths;

a matrix switch having m inputs operatively coupled to the m laser sources, a respective input of the m inputs receiving a respective optical wavelength of the m different optical wavelengths; and the matrix switch having n outputs, each of the outputs producing a respectively different optical wavelength, the optical wavelengths being interleaved relative to one another, and each output producing a series of interleaved pulses of the different optical wavelengths;

wherein each output produces a repeating series of m pulses, where the m pulses respectively have the m optical wavelengths, where m is the number of lasers, and where m is a whole number; and wherein outputs of the apparatus are operatively coupled to sensors, and wherein the apparatus interrogates XYZ sensors, where XYZ is the number of sensors, with X lasers, where X is the number of lasers, Y sensor returns per laser, where Y is the number of sensor returns per lasers, and Z switch positions for a Z x Z matrix switch in the apparatus, where Z is the number of switch positions and where X, Y, and Z are whole numbers.

8. The apparatus according to claim 7, wherein each output of the matrix switch is operatively coupled to respectively at least one of an optical gate, a phase modulator, and a series combination of an optical gate and a phase modulator.

9. The apparatus according to claim 7, wherein the matrix switch has functions of gating and switching.

10. The apparatus according to claim 7, wherein the apparatus is a time division multiplexer - wavelength division multiplexer (TDM-WDM) system.

* * * * *